(12) United States Patent
Krefeld

(10) Patent No.: US 7,628,256 B2
(45) Date of Patent: Dec. 8, 2009

(54) DEVICE FOR AMPLITUDE-DEPENDENT DAMPER

(75) Inventor: Andreas Krefeld, Duesseldorf (DE)

(73) Assignee: Thyssenkrupp Bilstein Suspension GmbH, Ennepetal (DE)

( * ) Notice: Subject to any disclaimer, the term of this patent is extended or adjusted under 35 U.S.C. 154(b) by 365 days.

(21) Appl. No.: 11/505,702

(22) Filed: Aug. 17, 2006

(65) Prior Publication Data
US 2007/0039791 A1    Feb. 22, 2007

(30) Foreign Application Priority Data
Aug. 17, 2005  (DE) ...................... 10 2005 038 797

(51) Int. Cl.
*F16F 9/508* (2006.01)
(52) U.S. Cl. ..................... 188/282.1; 188/267; 188/317
(58) Field of Classification Search ................ 188/267, 188/282.1, 280, 313, 316, 317
See application file for complete search history.

(56) References Cited

U.S. PATENT DOCUMENTS

| | | | | |
|---|---|---|---|---|
| 6,561,326 B2 * | 5/2003 | Gotz | ........................ | 188/316 |
| 6,955,248 B2 * | 10/2005 | Park et al. | .................... | 188/267 |
| 7,100,750 B2 * | 9/2006 | Drees | ......................... | 188/280 |
| 7,255,211 B2 * | 8/2007 | Gotz et al. | .................. | 188/280 |
| 7,441,639 B2 * | 10/2008 | Gotz et al. | .................. | 188/316 |

FOREIGN PATENT DOCUMENTS

| | | | |
|---|---|---|---|
| DE | 103 51 353 | | 2/2005 |
| JP | 04203635 A | * | 7/1992 |
| JP | 11013820 A | * | 1/1999 |

\* cited by examiner

*Primary Examiner*—Thomas J Williams
(74) *Attorney, Agent, or Firm*—Jordan and Hamburg LLP

(57) ABSTRACT

A vibration damper providing amplitude-dependent damping for motor vehicles includes a first damping device including a piston rod which is disposed in a damping tube so as to be moveable in an oscillating manner and which supports a damping piston which divides the interior of the damping tube into a piston rod-side working chamber and a working chamber remote from the piston rod. The vibration damper further includes a second damping device which is disposed hydraulically parallel to the damping piston and includes an equalizing chamber which is divided into a first and a second partial chamber by a separating piston disposed so as to be axially displaceable in the equalizing chamber, wherein the first partial chamber is hydraulically connected to the piston rod-side working chamber and the second partial chamber is hydraulically connected to the working chamber remote from the piston rod. The separating piston advantageously includes at least one permanent magnet and at least one additional permanent magnet disposed in each end region of the equalizing chamber such that magnetic poles having the same polarity face each other in the end positions of the axial displacement capability of the separating piston.

15 Claims, 1 Drawing Sheet

DEVICE FOR AMPLITUDE-DEPENDENT DAMPER

BACKGROUND OF THE INVENTION

The invention relates to a vibration damper having amplitude-dependent damping for motor vehicles.

Such a vibration damper is known, for example, from DE 103 51 353 A1. In this known vibration damper, a device for amplitude-dependent damping comprises a separating piston which is formed through an aluminium support ring in which, or on which, an elastomer element serving as a stop buffer is vulcanised in a firmly adhering manner. The elastomer element protrudes on both sides beyond the aluminium support ring in order to decelerate the separating piston in the region of the end positions of its stroke movement, and to reduce the impact accelerations. The elastomer element is subjected to severe stress by the continuous lifting and lowering of the separating piston which take place during operation of the shock absorber, so that it only has a limited service life. A further difficulty with respect to this known separating piston resides in the fact that the damping fluids/hydraulic oils used for motor vehicle shock absorbers greatly age the elastomer element, and thus additionally shorten its service life. The choice of material for the elastomer element, therefore clearly limits construction.

Therefore, it is the object of the invention to develop a vibration damper in such a manner that the stroke of the separating piston is decelerated in the end positions of the separating piston stroke and the separating piston stroke is quietly buffered without the components required for braking and buffering the separating piston being subjected to wear, and thus being encumbered with a limited service life.

SUMMARY OF THE INVENTION

This object is achieved in accordance with the invention by a vibration damper providing amplitude-dependent damping for motor vehicles which includes a first damping device including a piston rod which is disposed in a damping tube so as to be moveable in an oscillating manner and which supports a damping piston which divides the interior of the damping tube into a piston rod-side working chamber and a working chamber remote from the piston rod. The vibration damper further includes a second damping device which is disposed hydraulically parallel to the damping piston and includes an equalizing chamber which is divided into a first and a second partial chamber by a separating piston disposed so as to be axially displaceable in the equalizing chamber, wherein the first partial chamber is hydraulically connected to the piston rod-side working chamber and the second partial chamber is hydraulically connected to the working chamber remote from the piston rod. The separating piston advantageously includes at least one permanent magnet and at least one additional permanent magnet disposed in each end region of the equalizing chamber such that magnetic poles having the same polarity face each other in the end positions of the axial displacement capability of the separating piston.

In accordance with advantageous features of the invention, the repelling effect of like magnetic poles of permanent magnets is used to brake/decelerate the separating piston in the end positions of the separating piston stroke. Therefore, in accordance with the invention, the forces for damping or buffering the separating piston in the end positions of its movement are applied by the magnetic forces of permanent magnets.

For this purpose, the permanent magnets are placed with respect to each other such that like poles are always opposite one another. Repelling forces are thus produced in dependence upon the stroke of the separating piston; the smaller the gap between the separating piston and the end surfaces of the equalizing chamber, the larger the repelling forces. As a result, the movement of the piston is braked and acceleration peaks are minimized when the separating piston is lowered down.

With the solution in accordance with the invention, wear only occurs to the most limited extent since the separating piston is not braked and buffered in its end positions by means of mechanical contact of a resilient buffer element with the end surfaces of the equalizing chamber, but rather by means of the magnetic forces of permanent magnets. Owing to the extremely high magnetic forces, the device in accordance with the invention for amplitude-selective damping operates in an extremely low-wear manner when there are small air gaps between the mutually facing, like magnetic poles of the permanent magnets. Extremely high magnetic forces occur, particularly when using permanent magnets consisting of rare earth materials which comprise extremely high magnetic field strengths while having small dimensions, which magnetic forces can be used advantageously within the scope of the invention. Owing to the fact that there are no elastomer materials whatsoever, the device in accordance with the invention is extremely non-sensitive with respect to ageing influences of the damping fluids/hydraulic oils used.

Of course, it is also feasible that the separating piston comprises several permanent magnets. For example each separating piston surface which faces in each case an end side of the equalizing chamber, can comprise a separate permanent magnet. It would even be feasible to dispose several permanent magnets on each separating piston surface. However, in a preferred exemplified embodiment, the separating piston only comprises a single permanent magnet whose different magnetic poles are disposed at a mutual spaced disposition in the axial direction, wherein one magnetic pole is allocated to the end surface of the first partial chamber of the equalizing chamber and the other magnetic pole is allocated to the second partial chamber of the equalizing chamber.

Several permanent magnets can also be disposed in each end region of the equalizing chamber. However, in one preferred embodiment a single permanent magnet is also disposed in the respective end regions of the equalizing chamber. The important feature is that the permanent magnets disposed in the end regions of the equalizing chamber are arranged such that the magnetic pole allocated to the respective partial chamber of the equalizing chamber has the same polarity as the magnetic pole of the permanent magnet of the separating piston facing the corresponding partial chamber.

In order to magnetically decouple the permanent magnet(s) of the separating piston from the inner wall of the equalizing chamber, a non-magnetic insulating element is provided between the inner wall of the equalizing chamber and the permanent magnet(s). The insulating element can consist for example of aluminium or of synthetic material, ceramics or other non-magnetic materials can also be used for the insulating element.

In an advantageous manner, the equalizing chamber is disposed in a hollow chamber of the piston rod. In this manner, no additional constructional space is required for the equalizing chamber and the vibration damper can be constructed in such a manner as to save space.

In an advantageous manner, each end surface of the hollow chamber delimiting the equalizing chamber has at least one recess into which the at least one permanent magnet is inserted, said magnet co-operating with the permanent magnet of the separating piston in each case. As explained above, it is sufficient and therefore also preferred to dispose only a single permanent magnet in the end regions of the equalizing chamber. The individual permanent magnets are pressed into the corresponding recesses of the end surfaces of the equalizing chamber so that they are held in the piston rod by means of a press-fit arrangement.

The hydraulic connection between the working chamber remote from the piston rod and the second partial chamber of the equalizing chamber is advantageously formed by a simple bore through the piston rod and a bore penetrating the permanent magnet facing the second partial chamber. If the piston rod comprises a piston rod pin, on which the damping piston of the vibration damper is mounted, this bore also extends through this piston rod pin.

The hydraulic connection between the piston rod-side working chamber and the first partial chamber of the equalizing chamber is formed by a radial bore in the piston rod. This radial bore has a throttle effect when damping fluid flows therethrough. In this manner, the device for amplitude-dependent damping produces its damping effect.

In a preferred embodiment, the separating piston has a single permanent magnet which is surrounded by an insulating element formed in a sleeve-like manner. This insulating element can be formed for example by an aluminium sleeve or a synthetic material sleeve so that the permanent magnet forming the actual piston body is magnetically decoupled from the inner wall of the equalizing chamber.

In order to avoid the mutually facing surfaces of the permanent magnets of the separating piston and of the permanent magnets disposed in the end regions of the equalizing chamber contacting or striking one another in the end positions of the separating piston stroke and damage thus occurring, the sleeve surrounding the permanent magnet of the separating piston comprises, in the axial direction at the two ends of the separating piston, a section protruding beyond the permanent magnet so that the protruding sections of the sleeve act as stops with respect to the end surfaces of the equalizing chamber. Forming such stops for the separating piston is in particular necessary because the permanent magnets consist of very hard, ceramic-based materials which are correspondingly brittle and are quickly damaged during abrupt mechanical loading.

In order for the two partial chambers of the equalizing chamber to be hydraulically separated from one another, the sleeve surrounding the permanent magnet of the separating piston comprises a groove on its outer periphery for receiving a seal. This seal then lies tightly against the inner wall of the equalizing chamber so that the respective partial chambers of the equalizing chamber are hydraulically separated from one another by the separating piston.

The invention will be explained in detail hereinafter with the aid of a drawing illustrating an exemplified embodiment.

DETAILED DESCRIPTION OF THE PREFERRED EMBODIMENT

Figure 1:
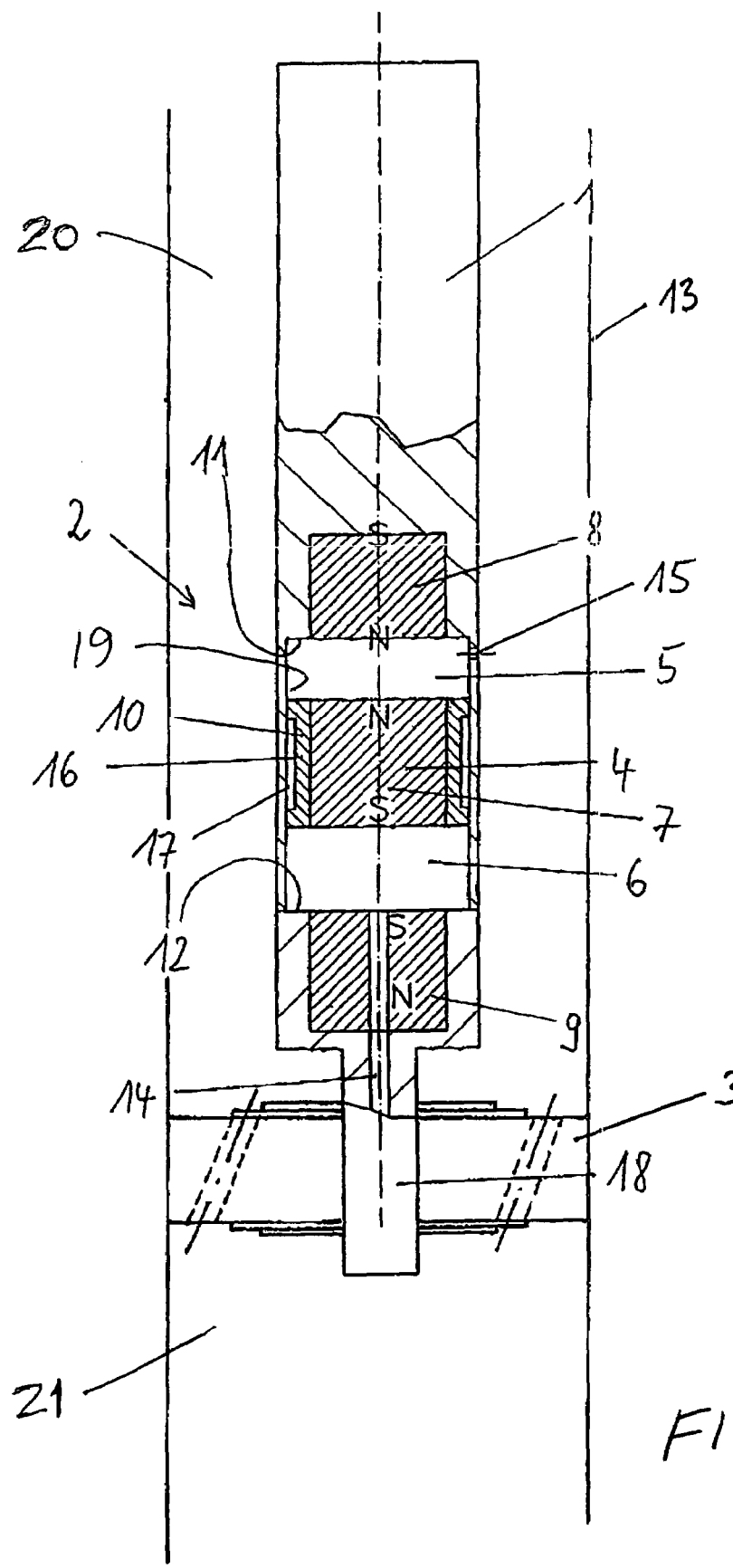
FIG. 1 depicts an axial cross-section view of a piston rod incorporating a device in accordance with an embodiment the invention for amplitude-dependent damping.

Referring to FIG. 1, a piston rod 1 comprises a piston rod pin 18 on which a damping piston 3, can be mounted. The piston rod 1 is movable in an oscillating manner in the axial direction in a vibration damping tube 13, by means of the damping piston attached to the piston rod. The damping piston 3 divides the interior of the damping tube 13 into a piston rod-side working chamber 20 and a working chamber 21 remote from the piston rod.

In addition to the damping piston 3, the piston rod 1 contains a further second damping device 2. Damping device 2 includes an equalizing chamber 19 which is formed through a hollow chamber in the piston rod 1. A separating piston 4 is disposed in the equalizing chamber 19, and is guided in the equalizing chamber 19 so as to be able to be displaced in an axial manner. The separating piston 4 divides the equalizing chamber into a first partial chamber 5 and a second partial chamber 6. The two partial chambers 5, 6 are sealed with respect to one another by a seal inserted in the groove 17 of the sleeve 16 of the separating piston 4.

The actual piston body of the separating piston 4 is formed by a permanent magnet 7, which comprises two opposing magnetic poles N, S disposed at a spaced disposition with respect to each other in the axial direction. The magnetic pole N is the north pole of the permanent magnet 7, and the magnetic pole S is the south pole of the permanent magnet 7.

In the depicted embodiment of FIG. 1, for example, the north pole N of the permanent magnet 7 faces the first partial chamber 5, while the south pole S of the permanent magnet 7 faces the second partial chamber 6. The equalizing chamber is delimited in the axial direction by end surfaces 11, 12. Recesses are advantageously provided in the surfaces of the end surfaces 11, 12 and permanent magnets 8, 9 are pressed into these recesses so that the permanent magnets 8, 9 are conveniently held in the recesses of the end surfaces 11, 12 by means of a press-fit arrangement.

In the depicted example, the permanent magnet 8 allocated to the first partial chamber 5 is disposed such that its north pole N faces the separating piston 4, while its south pole S is directed away from the separating piston 4. Likewise, the permanent magnet 9 allocated to the partial chamber 6 is disposed such that its south pole S faces the separating piston 4, and its north pole N faces the piston rod pin 18. In this manner, like magnetic poles of the permanent magnets 7, 8, 9 are allocated to each other in each case so that the repelling effect of like magnetic poles can occur in the end positions of the stroke movement of the separating piston 4. As the distance of the separating piston 4 from the end surfaces 11, 12 becomes smaller and smaller, the magnetic forces braking and buffering the separating piston become larger.

It is noted that while, in the example of FIG. 1, it is the north pole N of the permanent magnet 7 that faces the first partial chamber 5 and the south pole S of the permanent magnet 7 that faces the second partial chamber 6, in an alternative embodiment, these orientations can be reversed without departure from the invention, provided each of the north and south poles N, S opposes a like pole of respective ones of permanent magnets 8, 9.

When the separating piston 4 moves axially in the equalizing chamber 19, damping fluid flows either from the partial chamber 5 into the piston rod-side working chamber 20 or from the piston rod-side working chamber 20 into the partial chamber 5 through a bore 14. Simultaneously, damping fluid flows either from the working chamber remote from the piston rod 21 through a bore 14 into the partial chamber 6 or from the partial chamber 6 through the bore 14 into the working chamber remote from the piston rod 21. In each case, the bore 15 has a throttle effect whereby the damping device 2 produces its damping effect.

The previously described amplitude-dependent damping device is specifically designed for damping vibrations between the piston rod and the damping tube with a small amplitude. It is designed in particular for damping higher-frequency and high-frequency vibrations between the piston rod and the damping tube with a small amplitude.

The sleeve 16 surrounding the permanent magnet 7 of the separating piston 4 comprises sections at ends thereof facing the end surfaces 11, 12, which sections slightly protrude beyond the permanent magnet 7. In practice, several tenths of a millimeters are sufficient to ensure that the sleeve 16 protrudes beyond the permanent magnet 7 to a sufficient degree. The protruding sections of the sleeve 16 ensure that these protruding sections adjoin the respective opposite sections of the end surfaces 11, 12 when the separating piston 4 reaches its respective end position. As a result, it is ensured that the permanent magnets 7 and 8 or 7 and 9 do not contact each other when the respective end position of the displacement of the separating piston 4 is reached, i.e., in particular they do not abruptly contact each other. Mechanical damage to the permanent magnets 7, 8, 9 is effectively prevented in this manner.

The permanent magnets 7, 8, 9 illustrated in the exemplified embodiment are advantageously produced from rare earth materials so that the permanent magnets 7, 8, 9 produce very high magnetic field strengths even when the dimensions of the permanent magnets 7, 8, 9 are relatively small. In this manner, extremely high magnetic forces can be used for the braking and buffering of the separating piston 4 in accordance with the invention.

What is claimed is:

1. A vibration damper providing amplitude-dependent damping for motor vehicles, comprising:
  a first damping device including a piston rod which is disposed in a damping tube so as to moveable in an oscillating manner axially therein, and a damping piston supported by the piston rod which divides an interior of the damping tube into a piston rod-side working chamber and a working chamber remote from the piston rod; and
  a second damping device being disposed hydraulically parallel to the damping piston and comprising an equalizing chamber which is disposed in a hollow chamber of the piston rod, each end surface of the hollow chamber axially delimiting the equalizing chamber including at least one recess, the at least one additional permanent magnet being inserted into the at least one recess, said equalizing chamber being divided into a first partial chamber and a second partial chamber by a separating piston which is disposed so as to be axially displaceable in the equalizing chamber, the first partial chamber being hydraulically connected to the piston rod-side working chamber and the second partial chamber being hydraulically connected to the working chamber remote from the piston rod, the separating piston including at least one permanent magnet, and at least one additional permanent magnet being disposed in each end region of the equalizing chamber, the at least one permanent magnet and the at least one additional permanent magnet being disposed with respect to one another such that magnetic poles having the same polarity face each other in end positions of the axial displacement capability of the separating piston, only a single one of said at least one additional permanent magnet being disposed in each said end region of the equalizing chamber, the at least one additional permanent magnet being pressed into the at least one recess of the end surface, and being thus connected to the piston rod by a press-fit arrangement a hydraulic connection between the working chamber remote from the piston rod and the second partial chamber being formed by a bore penetrating the piston rod and the at least one additional permanent magnet.

2. A vibration damper providing amplitude-dependent damping for motor vehicles, comprising:
  a first damping device including a damping tube, a piston rod which is disposed in said damping tube so as to be moveable in an oscillating manner axially therein, and a damping piston supported by the piston rod which divides an interior of the damping tube into a piston rod-side working chamber and a working chamber remote from the piston rod; and
  a second damping device including an equalizing chamber and a separating piston which divides said equalizing chamber into a first partial chamber and a second partial chamber, said separating piston being disposed within the equalizing chamber in a manner allowing said separating piston to be axially displaceable in the equalizing chamber, the first partial chamber being hydraulically connected to the piston rod-side working chamber and the second partial chamber being hydraulically connected to the working chamber remote from the piston rod by respective connections which are independent of the first damping device such that the second damping device is arranged hydraulically parallel to the damping piston, the separating piston including at least one permanent magnet, and at least a first additional permanent magnet and a second additional permanent magnet being disposed respectively in each end region of the equalizing chamber, the at least one permanent magnet being disposed with respect to the at least first and second additional permanent magnets such that magnetic poles, having a same polarity, face each other in end positions of an axial displacement capability of the separating piston.

3. A vibration damper according to claim 2, further comprising an insulating element positioned so as to magnetically decouple the at least one permanent magnet of the separating piston from an inner wall of the equalizing chamber.

4. A vibration damper according to claim 2, wherein the equalizing chamber is cylindrical.

5. A vibration damper according to claim 2, wherein the equalizing chamber is disposed in a hollow chamber of the piston rod.

6. A vibration damper according to claim 5, wherein each end surface of the hollow chamber axially delimiting the equalizing chamber includes at least one recess, the at least one additional permanent magnet being inserted into the at least one recess.

7. A vibration damper according to claim 6, wherein only a single one of said at least one additional permanent magnet is disposed in each end region of the equalizing chamber.

8. A vibration damper according to claim 7, wherein the at least one additional permanent magnet is pressed into the at least one recess of the end surface, and are thus connected to the piston rod by a press-fit arrangement.

9. A vibration damper according to claim 2, wherein the hydraulic connection between the piston rod-side working chamber and the first partial chamber is formed by a radial bore in the piston rod.

10. A vibration damper according to claim 2, wherein the separating piston comprises a single permanent magnet which is surrounded by an insulating element formed as a sleeve.

11. A vibration damper according to claim 10, wherein the sleeve protrudes beyond the permanent magnet in the axial direction forming protruding sections of the sleeve which act as stops with respect to end surfaces of the permanent magnet.

12. A vibration damper according to claim 10, wherein the sleeve comprises a groove on an outer periphery thereof for receiving a seal.

13. A vibration damper according to claim 11, wherein the sleeve comprises a groove on an outer periphery thereof for receiving a seal.

14. A vibration damper according to claim 5, wherein the hydraulic connection between the piston rod-side working chamber and the first partial chamber is formed by a radial bore in the piston rod.

15. A vibration damper according to claim 5, wherein the separating piston comprises a single permanent magnet which is surrounded by an insulating element formed as a sleeve.

\* \* \* \* \*